United States Patent
Choi

(10) Patent No.: US 11,005,641 B2
(45) Date of Patent: May 11, 2021

(54) DISTRIBUTED ANTENNA SYSTEM FOR MULTIPLE INPUT MULTIPLE OUTPUT SIGNAL

(71) Applicant: SOLiD, INC., Seongnam-si (KR)

(72) Inventor: Jaehun Choi, Anyang-si (KR)

(73) Assignee: SOLiD, INC., Seongnam-si (KR)

( * ) Notice: Subject to any disclaimer, the term of this patent is extended or adjusted under 35 U.S.C. 154(b) by 201 days.

(21) Appl. No.: 15/421,799

(22) Filed: Feb. 1, 2017

(65) Prior Publication Data

US 2017/0149550 A1 May 25, 2017

Related U.S. Application Data

(63) Continuation of application No. PCT/KR2014/013105, filed on Dec. 31, 2014.

(30) Foreign Application Priority Data

Dec. 30, 2014 (KR) .................. 10-2014-0194359

(51) Int. Cl.
*H04L 5/14* (2006.01)
*H04B 7/024* (2017.01)
*H04B 7/0413* (2017.01)

(52) U.S. Cl.
CPC ............. *H04L 5/14* (2013.01); *H04B 7/024* (2013.01); *H04B 7/0413* (2013.01)

(58) Field of Classification Search
None
See application file for complete search history.

(56) References Cited

U.S. PATENT DOCUMENTS

| | | | | |
|---|---|---|---|---|
| 7,483,504 B2* | 1/2009 | Shapira | ............ | H04B 7/10 375/347 |
| 7,876,715 B1* | 1/2011 | Jin | ............ | H04B 7/0452 370/278 |
| 8,121,646 B2* | 2/2012 | Oren | ............ | H04B 17/12 455/562.1 |
| 8,310,963 B2* | 11/2012 | Singh | ............ | H04B 7/2609 370/280 |

(Continued)

FOREIGN PATENT DOCUMENTS

| KR | 10-2014-0012948 A | 2/2014 |
|---|---|---|
| WO | 2012/058182 A1 | 5/2012 |

OTHER PUBLICATIONS

International Search Report of PCT/KR2014/013105 dated Sep. 25, 2015.

(Continued)

*Primary Examiner* — Gregory B Sefcheck
(74) *Attorney, Agent, or Firm* — Sughrue Mion, PLLC

(57) ABSTRACT

According to an aspect of the inventive concept, there is provided a master unit included in a distributed antenna system of a frequency division duplex scheme, includes: a frequency converting unit converting a frequency of a first signal received from a base station into a predetermined frequency to generate a first frequency conversion signal; a signal combining unit combining the first frequency conversion signal and a second signal received from the base station to generate a transmit signal; and a signal transmitting/receiving unit transmitting the transmit signal to a remote unit connected through a single transmission line.

9 Claims, 5 Drawing Sheets

(56) References Cited

U.S. PATENT DOCUMENTS

| | | | | |
|---|---|---|---|---|
| 8,396,368 B2* | 3/2013 | Tarlazzi | | H04B 7/0413 398/115 |
| 8,428,033 B2* | 4/2013 | Hettstedt | | H04W 88/085 370/334 |
| 8,693,342 B2* | 4/2014 | Uyehara | | H04L 5/14 370/238 |
| 8,824,403 B2* | 9/2014 | Oh | | H04W 72/0413 370/329 |
| 8,873,585 B2* | 10/2014 | Oren | | H04B 7/022 370/334 |
| 9,179,321 B2* | 11/2015 | Hasarchi | | H04B 7/024 |
| 9,184,962 B2* | 11/2015 | Tarlazzi | | H04B 7/024 |
| 9,226,269 B2* | 12/2015 | Magne | | H04H 20/42 |
| 9,231,670 B2* | 1/2016 | Schmid | | H04B 1/0096 |
| 9,231,692 B2* | 1/2016 | Mendelsohn | | H04B 7/18517 |
| 9,246,559 B2* | 1/2016 | Tarlazzi | | H04B 7/024 |
| 9,247,543 B2* | 1/2016 | Berlin | | H04W 24/08 |
| 9,300,390 B2* | 3/2016 | Avellan | | H04B 7/18517 |
| 9,432,095 B2* | 8/2016 | Berlin | | H04B 7/0413 |
| 9,596,322 B2* | 3/2017 | Uyehara | | H04L 69/08 |
| 9,735,872 B2* | 8/2017 | You | | H04B 10/29 |
| 9,748,906 B2* | 8/2017 | Stewart | | H03F 1/3247 |
| 9,787,385 B2* | 10/2017 | Tarlazzi | | H04B 7/024 |
| 9,794,791 B2* | 10/2017 | Hasarchi | | H04B 7/024 |
| 9,923,621 B2* | 3/2018 | Campos | | H04L 27/2601 |
| 9,973,968 B2* | 5/2018 | Hazani | | H04W 74/04 |
| 10,153,814 B1* | 12/2018 | Liang | | H04B 7/024 |
| 10,355,754 B2* | 7/2019 | Morrison | | H04B 7/04 |
| 2009/0154621 A1 | 6/2009 | Shapira et al. | | |
| 2013/0188753 A1* | 7/2013 | Tarlazzi | | H04B 7/024 375/299 |
| 2014/0072071 A1 | 3/2014 | Berlin et al. | | |
| 2014/0213285 A1* | 7/2014 | Sauer | | H04W 64/00 455/456.1 |
| 2014/0269318 A1* | 9/2014 | Hasarchi | | H04B 7/024 370/235 |
| 2015/0365501 A1* | 12/2015 | Uyehara | | H04L 69/08 455/561 |
| 2019/0068250 A1* | 2/2019 | Kim | | H04B 7/024 |

OTHER PUBLICATIONS

Notice to Submit Response received in the Korean Patent Office in Application No. KR 10-2014-0194359 dated Feb. 9, 2017, along with English translation thereof.

* cited by examiner

DISTRIBUTED ANTENNA SYSTEM FOR MULTIPLE INPUT MULTIPLE OUTPUT SIGNAL

CROSS REFERENCE TO RELATED APPLICATIONS

This application is a Continuation of PCT International Application No. PCT/KR2014/013105, filed Dec. 31, 2014, and claims priority from Korean Patent Application No. 10-2014-0194359 filed Dec. 30, 2014, the contents of which are incorporated herein by reference in their entireties.

BACKGROUND

1. Field

The inventive concept relates to a distributed antenna system for a multiple input multiple output signal, and more particularly, to a transmission of a multiple input multiple output signal in a distributed antenna system of a frequency division duplex (FDD) scheme.

2. Description of Related Art

With the propagation of a smart phone, a wireless multimedia service, a social networking service (SNS), and Internet of things have been widely propagated, wireless data traffic has explosively increased. A big data environment which is not easily processed by the existing data transmission scheme has arrived.

As a result, a distributed antenna system is used, in which one master unit (MU) connected with a base station can control remote units (RUs) which are multiple antenna modules optically connected in order to efficiently manage radio resources. Further, a multiple input multiple output (hereinafter, referred to as 'MIMO') is used, which improves data transmission efficiency by simultaneously transmitting/receiving data by means of multiple antennas.

Korean Patent Unexamined Publication No. 10-2013-0124339 (hereinafter, referred to as prior art) discloses a distributed antenna system for MIMO signals. The distributed antenna system in the prior art includes the base station, the master unit, the remote unit, and the like, the base station transmits/receives the MIMO signal to/from the master unit, and the master unit transmits/receives the MIMO signal to/from the remote unit. When the master unit transmits the MIMO signal constituted by a first signal and a second signal to the remote unit, the master unit converts and transmits a frequency of the second signal so that the first signal and the signal do not overlap with each other. In this case, the master unit converts the frequency by considering even a situation of another frequency band so that the signal in another frequency band is not interfered by the second signal of which the frequency is converted. Such an operation is similarly even to a reverse direction (that is, when the MIMO signal is transmitted from the remote unit to the master unit).

That is, the master unit searches a frequency band (hereinafter, referred to as 'unused band') which is not currently used among multiple serviced frequencies to convert the frequency of the second signal to correspond to the unused band and thereafter, transmit the first signal and the second signal to the remote unit.

However, when the distributed antenna system cannot search the unused band, a problem that the MIMO signal cannot be transmitted occurs. The problem can more frequently occur in a multi-band system (that is, a communication system in which signals corresponding to a plurality of frequency bands are serviced) in the multi-band system and in particular, the problem can more frequently occur as the number of frequency bands using the MIMO technology increases. The reason is that as the number of frequency bands which are serviced increases, the number of unused bands decreases.

SUMMARY

The inventive concept is directed to a distributed antenna system which can transmit/receive an MIMO signal between a master unit and a remote unit without searching an unused band.

According to an aspect of the inventive concept, there is provided a master unit included in a distributed antenna system of a frequency division duplex scheme, includes: a frequency converting unit converting a frequency of a first signal received from a base station into a predetermined frequency to generate a first frequency conversion signal; a signal combining unit combining the first frequency conversion signal and a second signal received from the base station to generate a transmit signal; and a signal transmitting/receiving unit transmitting the transmit signal to a remote unit connected through a single transmission line.

Herein, the frequency converting unit may convert the frequency of the first signal into a receive frequency used in a reverse communication of a service associated with the first signal.

Further, the frequency converting unit may include a local oscillating unit outputting a predetermined oscillation frequency signal; and a first frequency converting unit generating the first frequency conversion signal by using the first signal and the oscillation frequency signal.

In addition, the signal combining unit may combine the first frequency conversion signal, the second signal, and the oscillation frequency signal to generate the transmit signal.

Moreover, the master unit may further include a signal separating unit separating a receive signal into a second frequency conversion signal and a fourth signal and outputting the second frequency conversion signal and the fourth signal to the frequency converting unit, wherein the signal transmitting/receiving unit may receive the receive signal from the remote unit and output the received receive signal to the signal separating unit and the frequency converting unit may convert the second frequency conversion signal into a third signal by using the oscillation frequency signal.

Further, the frequency converting unit may further include a second frequency converting unit converting the second frequency conversion signal into the third signal by using the oscillation frequency signal, and the local oscillating unit may output the oscillation frequency signal to the second frequency converting unit.

According to another aspect of the inventive concept, there is provided a remote unit included in a distributed antenna system, comprising: a signal transmitting/receiving unit receiving a transmit signal from a master unit connected through a single transmission line; a signal separating unit separating the transmit signal into a first frequency conversion signal, a second signal, and an oscillation frequency signal; and a frequency converting unit converting the first frequency conversion signal into a first signal by using the oscillation frequency signal.

Herein, the frequency converting unit may include a local oscillating unit outputting the oscillation frequency signal; and a frequency converting unit converting the first frequency conversion signal into the first signal by using the first frequency conversion signal and the oscillation frequency signal.

Further, the remote unit may further include: an antenna unit receiving a third signal and a fourth signal; and a signal combining unit combining the third signal and a second frequency conversion signal to generate a receive signal, wherein the frequency converting unit may convert a frequency of the third signal into a predetermined frequency to generate the second frequency conversion signal and the signal transmitting/receiving unit may transmit the receive signal to the master unit.

In addition, the frequency converting unit may convert the frequency of the third signal into a transmit frequency used in a forward communication of a service associated with the third signal.

Further, the frequency converting unit may further include a second frequency converting unit generating the second frequency conversion signal by using the third signal and the oscillation frequency signal, and the local oscillating unit outputs the oscillation frequency signal to the second frequency converting unit.

According to yet another aspect of the inventive concept, there is provided a distributed antenna system of a frequency division duplex scheme, comprising: a master unit converting a first signal received from a base station into a first frequency conversion signal by using a predetermined oscillation frequency signal, combining the first frequency conversion signal, a second signal received from the base station, and the oscillation frequency signal to generate a transmit signal, and transmitting the transmit signal; and a remote unit separating the transmit signal into the first frequency conversion signal, the second signal, and the oscillation frequency signal and converting the first frequency conversion signal into the first signal by using the oscillation frequency signal.

Herein, the master unit may convert a frequency of the first signal into a receive frequency used in a reverse communication of a service associated with the first signal to generate the first frequency conversion signal.

Further, the remote unit may convert a third signal received from an antenna included therein into a second frequency conversion signal by using the oscillation frequency signal, combine a fourth signal received from the antenna and the second frequency conversion signal to generate a receive signal, and transmit the receive signal to the master unit.

In addition, the master unit may separate the receive signal into the second frequency conversion signal and the fourth signal, convert the second frequency conversion signal into the third signal by using the oscillation frequency signal, and transmit the third signal and the fourth signal to the base station.

According to embodiments of the inventive concept, a distributed antenna system can transmit/receive an MIMO signal between a master unit and a remote unit without searching an unused band.

DETAILED DESCRIPTION OF EXEMPLARY EMBODIMENTS

Figure 1:
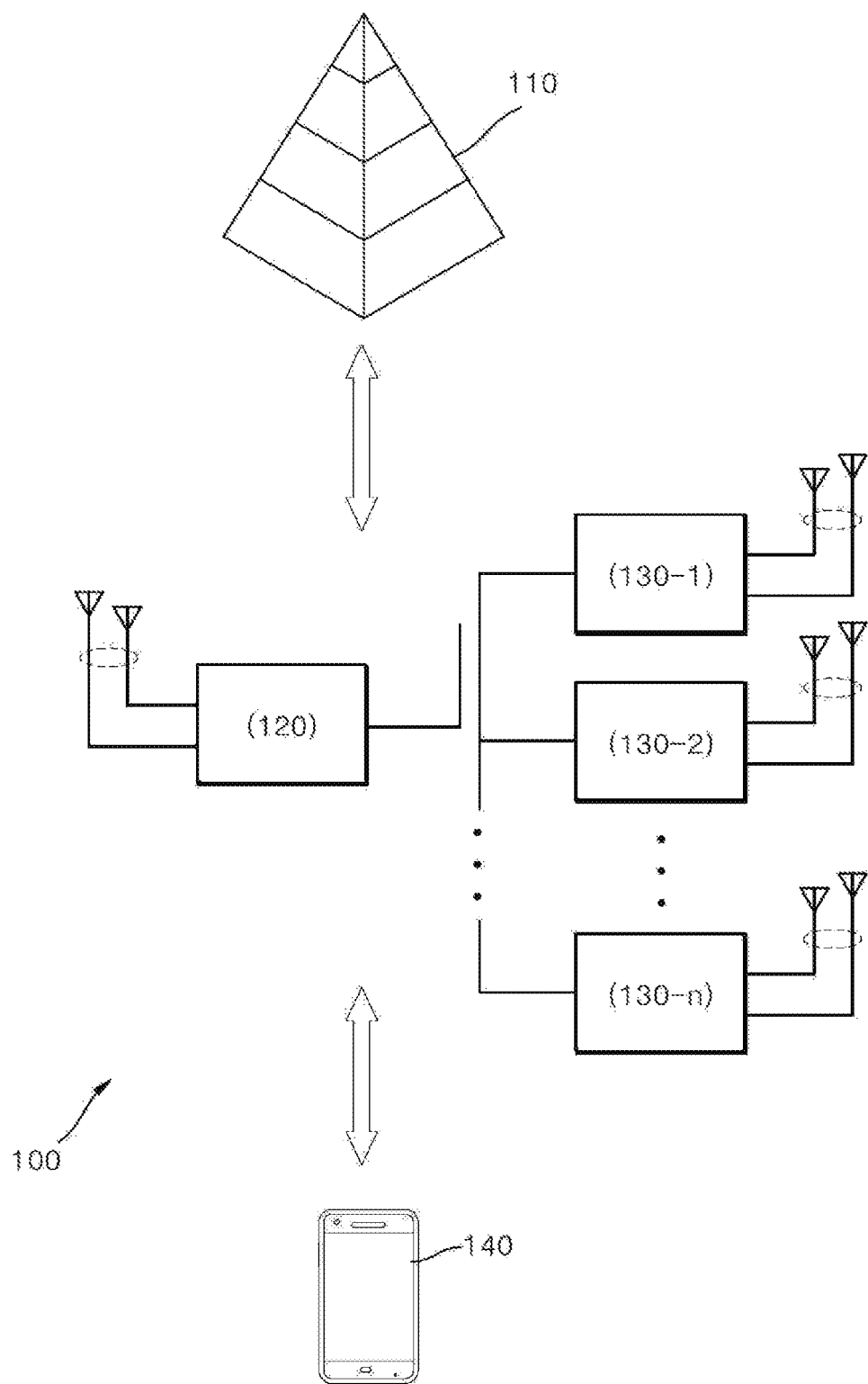
FIG. 1 is a configuration diagram of a distributed antenna system according to an embodiment of the inventive concept.

The inventive concept may have various modifications and various embodiments and specific embodiments will be illustrated in the drawings and described in detail in the detailed description. However, this does not limit the inventive concept within specific embodiments, and it should be understood that the inventive concept covers all the modifications, equivalents and replacements within the idea and technical scope of the inventive concept. Further, in the inventive concept, a detailed explanation of known related technologies may be omitted to avoid unnecessarily obscuring the gist of the inventive concept.

Terms such as first, second, and the like may be used to describe various components and the components should not be limited by the terms. The terms are used only to discriminate one constituent element from another component.

Terms used in the present application are used only to describe specific embodiments, and are not intended to limit the inventive concept. Singular expressions used herein include plural expressions unless they have definitely opposite meanings in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance. Hereinafter, embodiments of the inventive concept will be described in detail with reference to the accompanying drawings.

FIG. 1 is a configuration diagram of a distributed antenna system according to an embodiment of the inventive concept.

Referring to FIG. 1, the distributed antenna system 100 according to the embodiment of the inventive concept includes a base station 110, a master unit 120, and n remote units 130-1, 130-2 . . . , 130-n (however, n is a natural number). The base station 110 may be connected with the master unit 120 by a wire and/or wirelessly, and the master unit 120 may be connected with n remote units 130-1, 130-2 . . . , 130-n by the wire and/or wirelessly and the mater unit 120 may be connected with the n remote units 130-1, 130-2 . . . , 130-n through a single transmission line when being connected with n remote units 130-1, 130-2 . . . , 130-n by the wire (without separately forming a forward transmission line and a reverse transmission line). For example, the master unit 120 may be connected with n remote units 130-1, 130-2 . . . , 130-n through the single optical transmission line. Further, in FIG. 1, it is illustrated as if the base station 110 and the master unit 120 are directly connected with each other, but the base station 110 and the master unit 120 may be connected through another device such as a repeater (not illustrated), and the like.

Further, the base station 110 and the master unit 120 may transmit/receive the MIMO signal to/from each other and the master unit 120 and n remote units 130-1, 130-2 . . . , 130-n may also transmit/receive the MIMO signal to/from each other. Hereinafter, for convenience of appreciation and description, a case in which the base station 110 and the master unit 120 transmit the MIMO signal constituted by two signals will be limitatively described. Further, a case in which the master unit 120 and n remote units 130-1, 130-2 . . . , 130-n may also transmit/receive the MIMO signal constituted by two signals to/from each other will be limitatively described. Accordingly, the number of MIMO signals may not limit the scope of the inventive concept.

Further, the distributed antenna system 100 may operate by a frequency division duplex (FDD) scheme. The FDD scheme is a scheme that distinguishes forward and reverse communication channels. Accordingly, hereinafter, it is described that a frequency corresponding to forward communication is defined as a 'transmit frequency' and a frequency corresponding to reverse communication is defined as a 'receive frequency'. That is, the base station 110 may transmit two MIMO signals to the master unit 120 by using the transmit frequency. Further, the remote unit 130-n may radiate two MIMO signals to the outside by using the transmit frequency. In addition, the master unit 120 may transmit two signals received from the remote unit 130-n to the base station 110 by using the receive frequency.

Meanwhile, when the master unit 120 and n respective remote units 130-1, 130-2 . . . , 130-n are connected with each other through the single transmission line, a frequency of one signal between two MIMO signals needs to be converted. The reason is that when two MIMO signals are simultaneously transmitted through the single transmission line, the signals may overlap with each other. This is similarly applied even to the case in which the n-th remote unit 130-n transmits two MIMO signals to the master unit 120. Accordingly, the master unit 120 converts one of two MIMO signals into a predetermined frequency to transmit one signal to the n-th remote unit 130-n. Further, the n-th remote unit 130-n also converts one of two MIMO signals into a predetermined frequency to transmit one signal to the n-th remote unit 130-n. Hereinafter, operations of the master unit 120 and the n-th remote unit 130-n according to an embodiment of the inventive concept will be described in more detail with reference to FIGS. 2 to 5.

Figure 2:
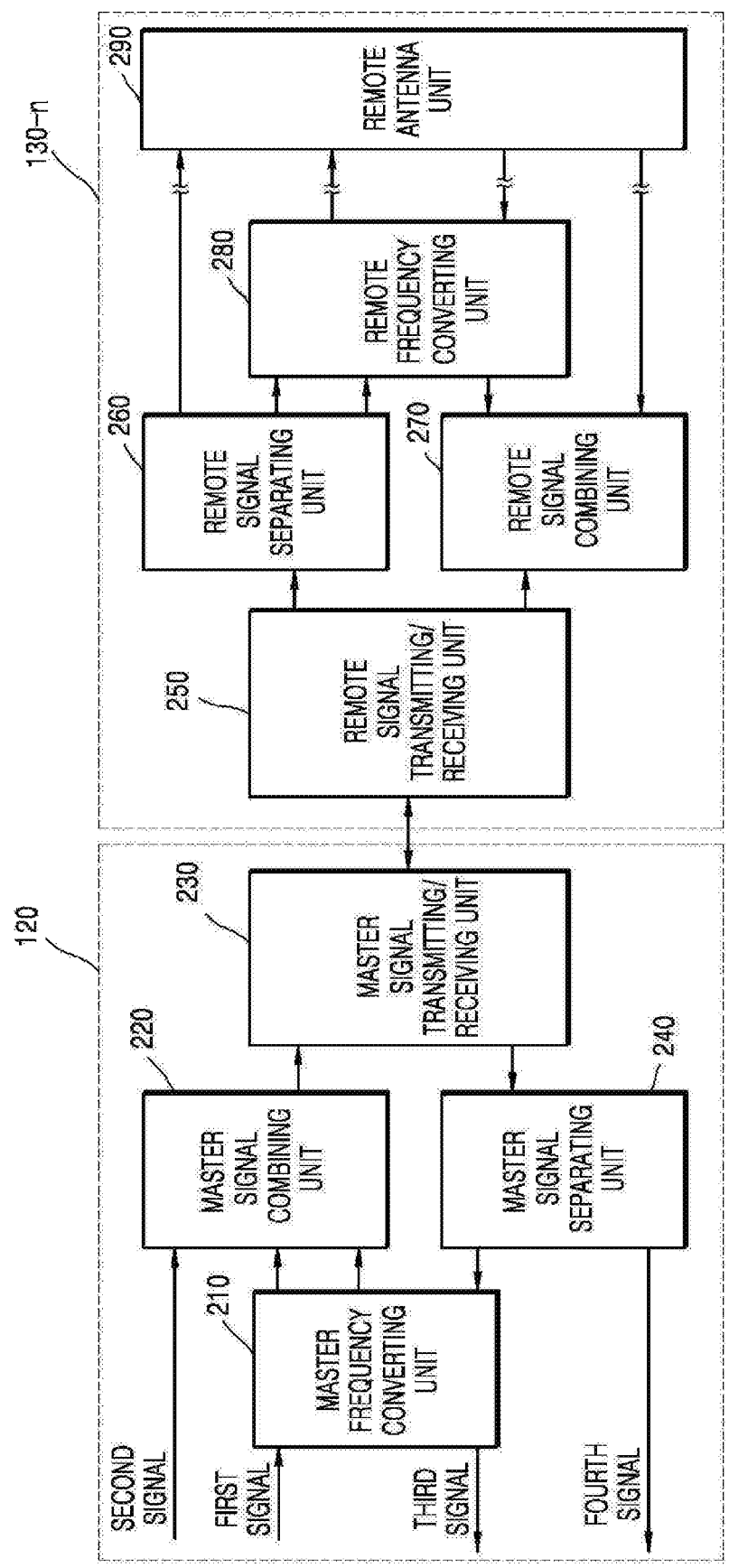
FIG. 2 is a block diagram of downlink parts of a master unit and a remote unit according to an embodiment of the inventive concept.

FIG. 2 is a block diagram of downlink parts of a master unit and a remote unit according to an embodiment of the inventive concept.

Referring to FIG. 2, the master unit 120 according to the embodiment of the inventive concept may include a master frequency converting unit 210, a master signal combining unit 220, a master signal transmitting/receiving unit 230, and a master signal separating unit 240. Further, the n-th remote unit 130-n according to the embodiment of the inventive concept may include a remote signal transmitting/receiving unit 250, a remote signal separating unit 260, a remote signal combining unit 270, a remote frequency converting unit 280, and a remote antenna unit 290. Herein, it is assumed that the master unit 120 receives the MIMO signal constituted by the first signal and the second signal from the base station 110. Further, it is assumed that the remote antenna unit 290 receives a MIMO signal constituted by third and fourth signals. Accordingly, the master unit 120 transmits the first and second signals to the n-th remote unit 130-n to radiate the transmitted first and second signals to the outside through the remote antenna unit 290. Further, the n-th remote unit 130-n transmits the third and fourth signals to the master unit 120 to transmit the transmitted third and fourth signals to the base station 110.

In this case, the master frequency converting unit 210 converts the first signal received from the base station 110 into a predetermined frequency to generate a first frequency conversion signal. For example, the master frequency converting unit 210 converts the frequency of the first signal into a receive frequency corresponding to the frequency of the first signal to generate the first frequency conversion signal. Since the distributed antenna system 100 operates by the FDD scheme, the frequency of the first signal will correspond to the transmit frequency. Accordingly, the master frequency converting unit 210 converts the frequency of the first signal to correspond to the receive frequency to generate the first frequency conversion signal.

That is, it is assumed that the transmit frequency is set to 5 GHz and the receive frequency is set to 6 GHz. In this case, the frequency of the first signal received from the base station 1100 will correspond to 4 GHz. Accordingly, the master frequency converting unit 210 converts 4 GHz which is the frequency of the first signal into 6 GHz to generate the first frequency conversion signal. Hereinafter, an operation in which the master frequency converting unit 210 generates the first frequency conversion signal will be described in more detail with reference to FIG. 3.

Figure 3:
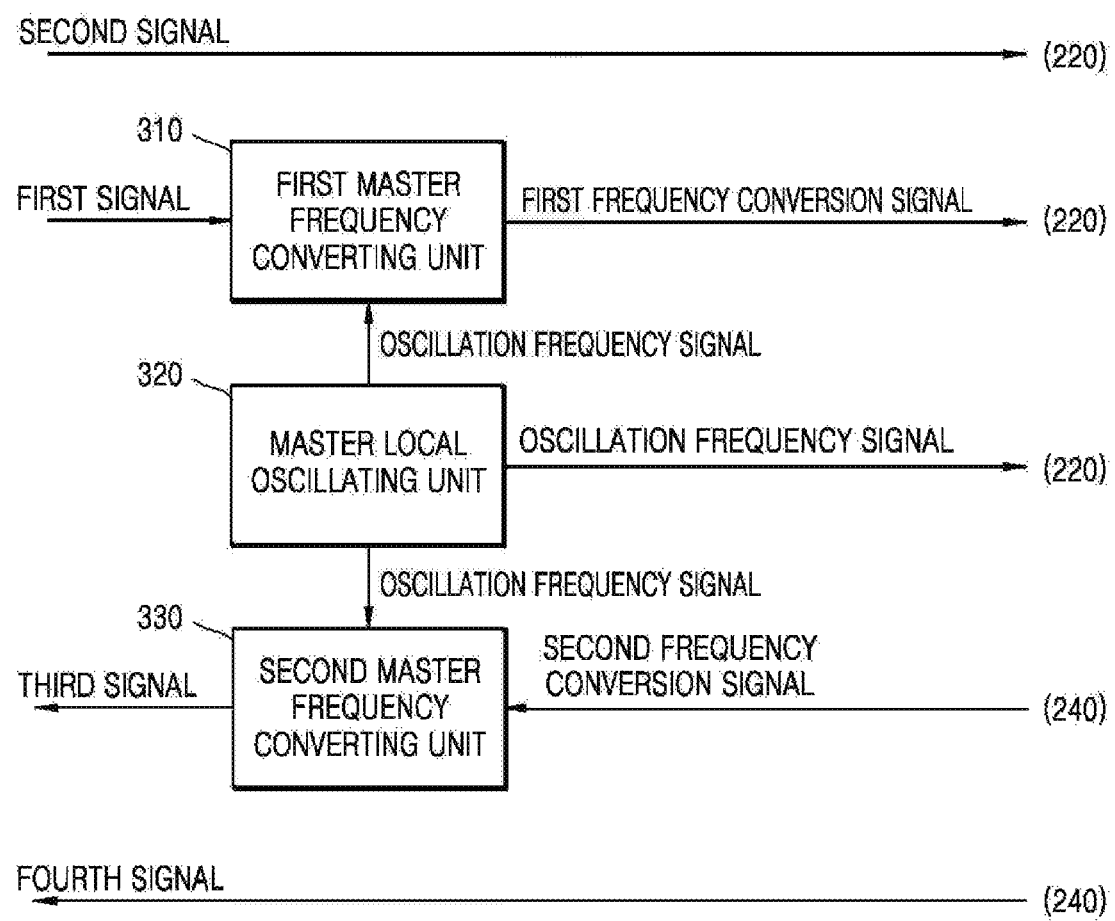
FIG. 3 is a block diagram of a master frequency converting unit according to an embodiment of the inventive concept.

FIG. 3 is a block diagram of a master frequency converting unit according to an embodiment of the inventive concept.

Referring to FIG. 3, the master frequency converting unit 210 according to the embodiment of the inventive concept may include a first master frequency converting unit 310, a master local oscillating unit 320, and a second master frequency converting unit 330.

The master local oscillating unit 320 may output a signal (hereinafter, referred to as an 'oscillation frequency signal') corresponding to a predetermined frequency to the first master frequency converting unit 310 and/or the second master frequency converting unit 320. In addition, the master local oscillating unit 320 may output the oscillation frequency signal to the master signal combining unit 220. Herein, the master local oscillating unit 320 may includes a local oscillator. Therefore, the oscillation frequency signal generated by the local oscillator may be output to the first master frequency converting unit 310, the second master frequency converting unit 320, and/or the master signal combining unit 220.

When the first master frequency converting unit 310 receives the first signal, the first master frequency converting unit 310 converts the frequency of the first signal into the predetermined frequency by using the oscillation frequency signal input in the master local oscillating unit 320 to generate the first frequency conversion signal. Herein, the first master frequency converting unit 310 may include a mixer. Accordingly, the mixer may generate the first frequency conversion signal corresponding to the receive frequency by mixing the first signal and the oscillation frequency signal and although the first frequency conversion signal corresponding to the receive frequency is transmitted simultaneously with the first signal, the first frequency conversion signal will not overlap with the first signal. The reason is that the first signal corresponds to the oscillation frequency by the FDD scheme.

Herein, the master local oscillating unit 320 may continuously generate and output the same oscillation frequency signal. Accordingly, the first master frequency converting unit 310 may continuously generate the first frequency conversion signal corresponding to the receive frequency by mixing the first signal and the oscillation frequency signal. For example, assumed that the transmit frequency is set to 4 GHz and the receive frequency is set to 6 GHz, the frequency of the first signal will be 4 GHz. Accordingly, the frequency of the first frequency conversion signal generated by mixing the first signal and the oscillation frequency signal will be continuously 6 GHz.

In addition, the first master frequency converting 310 may output the generated first frequency conversion signal to the master signal combining unit 220.

Referring back to FIG. 2, since the master unit 120 and the n-th remote unit 130-*n* may be connected with each other through the single transmission line, the master signal combining unit 220 combines the first frequency conversion signal, the second signal (received from the base station 110), and/or the oscillation frequency signal into one to generate a transmit signal. Further, the master signal combining unit 220 may output the generated transmit signal to the master signal transmitting/receiving unit 230. Since an operation in which the master signal combining unit 220 combines the first frequency conversion signal, the second signal, and/or the oscillation frequency signal to generate the transmit signal is apparent to those skilled in the art, detailed description of the operation will be omitted.

In addition, the master signal transmitting/receiving unit 230 may transmit an input the transmit signal to the n-th remote unit 130-*n* (in particular, the remote signal transmitting/receiving unit 250). It is assumed that the master signal transmitting/receiving unit 230 and the remote signal transmitting/receiving unit 250 are connected to each other through the single optical transmission line. In this case, the master signal transmitting/receiving unit 230 may include a laser diode for converting the transmit signal which is an electrical signal into an optical signal. Further, the master signal transmitting/receiving unit 230 may include a wavelength division multiplexer (WDM) for transmitting the transmit signal converted into the optical signal to the remote signal transmitting/receiving unit 250.

Accordingly, the master unit 120 transmits the first and second signals to the n-th remote unit 130-*n* connected through the single transmission line without overlapping of the first and second signals. The reason is that the first signal is converted into the first frequency conversion signal and transmitted, the first frequency conversion signal corresponds to the receive frequency, and the second signal corresponds to the transmit frequency. Hereinafter, an operation in which the first frequency conversion signal is restored to the first signal in the n-th remote unit 130-*n* will be described in detail.

The remote signal transmitting/receiving unit 250 may output the received transmit signal to the remote signal separating unit 260. In this case, when the master signal transmitting/receiving unit 230 and the remote signal transmitting/receiving unit 250 are connected to each other through the optical transmission line, the transmit signal will be received as the optical signal. Accordingly, the remote signal transmitting/receiving unit 250 may include the wavelength division multiplexer (WDM) for receiving the transmit signal as the optical signal. Further, the remote signal transmitting/receiving unit 250 may include a photo diode for converting the optical signal into the electrical signal. Therefore, the remote signal transmitting/receiving unit 250 may restore the transmit signal received as the optical signal to the electrical signal and output the electrical signal to the remote signal separating unit 260.

The remote signal separating unit 260 may separate the input transmit signal into the first frequency conversion signal, the second signal, and/or the oscillation frequency signal. Further, the remote signal separating unit 260 may output the first frequency conversion signal and/or the oscillation frequency signal to the remote frequency converting unit 280. Since an operation in which the remote signal separating unit 260 separates the transmit signal into the first frequency conversion signal, the second signal, and/or the oscillation frequency signal is apparent to those skilled in the art, detailed description of the operation will be omitted.

The remote frequency converting unit 280 may convert the first frequency conversion signal into the first signal by using the oscillation frequency signal. Hereinafter, the operation in which the remote frequency converting unit 280 converts the first frequency conversion signal into the first signal will be described in more detail with reference to FIG. 4.

Figure 4:
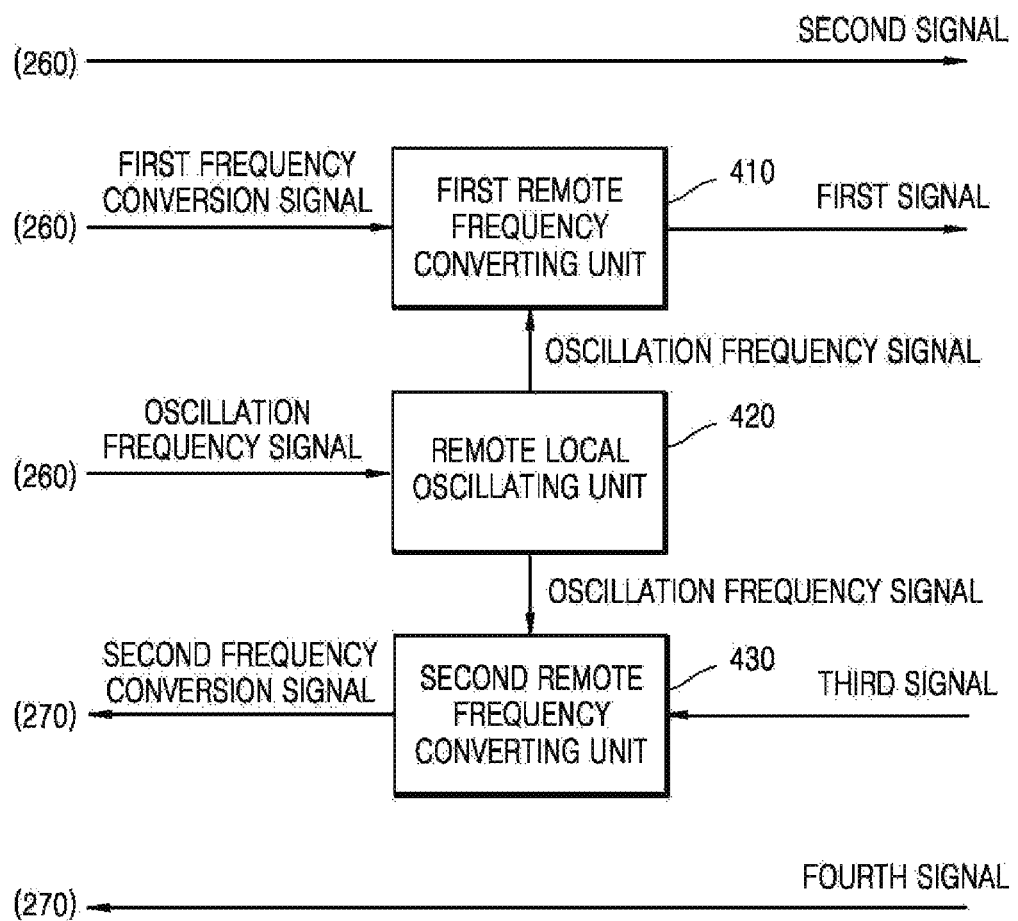
FIG. 4 is a block diagram of a remote frequency converting unit according to an embodiment of the inventive concept.

FIG. 4 is a block diagram of a remote frequency converting unit according to an embodiment of the inventive concept.

Referring to FIG. 4, the remote frequency converting unit 280 according to the embodiment of the inventive concept may include a first remote frequency converting unit 410, a remote local oscillating unit 420, and a second remote frequency converting unit 430.

The remote local oscillating unit 420 may output the oscillation frequency signal input by the master unit 120 to the first remote frequency converting unit 410 and/or the second remote frequency converting unit 430. Herein, the remote local oscillating unit 420 may include the local oscillator. Accordingly, the local oscillator may output the oscillation frequency signal received by the master unit 120 to the first remote frequency converting unit 410 and/or the second remote frequency converting unit 430.

When the first master frequency converting unit 410 receives the first frequency conversion signal, the first remote frequency converting unit 410 may convert the frequency of the first frequency conversion signal into the predetermined frequency by using the oscillation frequency signal input in the remote local oscillating unit 420 and convert the predetermined frequency into the first signal. Herein, the first remote frequency converting unit 410 may include the mixer. Therefore, the mixer may convert the first frequency conversion signal into the first signal by mixing the first frequency conversion signal and the oscillation frequency signal.

Herein, the remote local oscillating unit 420 may generate and output the oscillation frequency received by the master unit 120. Therefore, the first remote frequency converting unit 410 may convert the first frequency conversion signal into the first signal by mixing the first frequency conversion signal and the oscillation frequency signal. The reason is that the master unit 120 generates the first frequency conversion signal by mixing the oscillation frequency signal with the first signal. For example, assumed that the transmit frequency is set to 4 GHz and the receive frequency is set to 6 GHz, the frequency of the first frequency conversion signal will be 6 GHz. The reason is that when the first signal having the frequency of 4 GHz and the oscillation frequency signal are mixed with each other, the first frequency conversion signal having the frequency of 6 GHz is preconfigured to be generated. Therefore, the first remote frequency converting unit 410 may restore the first signal having the frequency of 4 GHz by mixing the first frequency conversion signal and the oscillation frequency signal.

Referring back to FIG. 2, the n-th remote unit 130-*n* may perform processing such as amplification of the first signal and/or the second signal, and the like and thereafter, transmit the amplified first signal and/or second signal to the outside through the remote antenna unit 290.

Hereinabove, the operation in which the master unit 120 transmits the first and second signals to the n-th remote unit 130-*n* has been described. The master unit 120 may convert the frequency of the first signal into the receive frequency in order to transmit the first and second signals to the n-th remote unit **130-*n* connected through the single transmission line without overlapping of the first and second signals. Accordingly, the master unit 120** needs to search the unused band in order to transmit the MIMO signal. The reason is that the transmit frequency and the receive frequency are distinguished in the FDD scheme and it is apparent that when the first signal occupies the transmit frequency in forward transmission, the receive frequency is an unused frequency.

Further, there is no possibility that when the master unit 120 and the n-th remote unit **130-*n* are connected to each other through the single optical transmission line, the first frequency conversion signal will be interfered by a reverse transmission signal. The reason is that when the master unit 120 and the n-th remote unit 130-*n* are connected to each other through the optical transmission line, a forward signal and a reverse signal do not overlap with each other even though frequencies of both the forward signal and the reverse signal are the same as each other by directionality of the optical signal. Therefore, since the master unit 120** need not include a plurality of local oscillators for variously converting the frequency, a price of a product may be lowered.

Hereinafter, an operation in which the n-th remote unit **130-*n* transmits the MIMO signal constituted by the third and four signals to the master unit 120** will be described.

First, the remote antenna unit 290 may receive and output the third and fourth signals.

When the remote frequency converting unit 280 receives the third signal, the remote frequency converting unit 280 converts the third signal into a predetermined frequency to generate a second frequency conversion signal. For example, the remote frequency converting unit 280 converts the frequency of the third signal into a transmit frequency corresponding to the frequency of the third signal to generate the second frequency conversion signal. Since the distributed antenna system 100 operates by the FDD scheme, the frequency of the third signal will correspond to the receive frequency. Accordingly, the remote frequency converting unit 280 converts the frequency of the third signal to correspond to the transmit frequency to generate the second frequency conversion signal.

That is, it is assumed that the transmit frequency is set to 4 GHz and the receive frequency is set to 6 GHz. In this case, the frequency of the third signal received from the remote antenna unit 280 will correspond to 6 GHz. Accordingly, the remote frequency converting unit 280 converts the frequency of the third signal into 4 GHz to generate the second frequency conversion signal. Hereinafter, the operation in which the remote frequency converting unit 280 generates the second frequency conversion signal will be described in more detail with reference to FIG. 4.

Referring to FIG. 4, the remote local oscillating unit 420 may output the oscillation frequency signal received from the master unit 120 to the second remote frequency converting unit 430 as described above. Therefore, when the second remote frequency converting unit 430 receives the third signal, the second remote frequency converting unit 430 converts the frequency of the third signal into the predetermined frequency by using the oscillation frequency signal input in the remote local oscillating unit 420 to generate the second frequency conversion signal. Herein, the second remote frequency converting unit 430 may include the mixer. Accordingly, the mixer may generate the second frequency conversion signal corresponding to the transmit frequency by mixing the third signal and the oscillation frequency signal and although the second frequency conversion signal corresponding to the transmit frequency is transmitted simultaneously with the fourth signal, the second frequency conversion signal will not overlap with the fourth signal. The reason is that the fourth signal corresponds to the receive frequency by the FDD scheme.

Herein, since the remote local oscillating unit 420 may continuously generate and output the same oscillation frequency signal, the second master frequency converting unit 420 may continuously generate the second frequency conversion signal corresponding to the transmit frequency by mixing the third signal and the oscillation frequency signal. For example, assumed that the transmit frequency is set to 4 GHz and the receive frequency is set to 6 GHz, the frequency of the third signal will be 6 GHz. Accordingly, the frequency of the second frequency conversion signal generated by mixing the third signal and the oscillation frequency signal will be continuously 4 GHz.

In addition, the second master frequency converting 430 may output the generated second frequency conversion signal to the remote signal combining unit 270.

Referring back to FIG. 2, since the master unit 120 and the n-th remote unit **130-*n* may be connected with each other through the single transmission line, the remote signal combining unit 270 combines the second frequency conversion signal and/or the fourth signal into one to generate the receive signal. The n-th remote unit 130-*n* may not combine the oscillation frequency signal together unlike the master unit 120 at the time of generating the receive signal. The reason is that the oscillation frequency signal is generated by the master unit 120**.

Further, the remote signal combining unit 270 may output the generated receive signal to the remote signal transmitting/receiving unit 250. Since the operation in which the remote signal combining unit 270 combines the second frequency conversion signal and/or the fourth signal to generate the receive signal is apparent to those skilled in the art, detailed description of the operation will be omitted.

In addition, the remote signal transmitting/receiving unit 250 may transmit an input receive signal to the master unit 120 (in particular, the master signal transmitting/receiving unit 230). It is assumed that the master signal transmitting/receiving unit 230 and the remote signal transmitting/receiving unit 250 are connected to each other through the single optical transmission line. In this case, the remote signal transmitting/receiving unit 250 may include the laser diode for converting the transmit signal which is the electrical signal into the optical signal. Further, the remote signal transmitting/receiving unit 250 may include the wavelength division multiplexer (WDM) for transmitting the transmit signal converted into the optical signal to the master signal transmitting/receiving unit 230.

Accordingly, the n-th remote unit **130-*n* may transmit the third and fourth signals to the master unit 120 connected through the single transmission line without overlapping of the third and fourth signals. The reason is that the third signal is converted into the second frequency conversion signal and transmitted, the second frequency conversion signal corresponds to the transmit frequency, and the fourth signal corresponds to the receive frequency. Hereinafter, an operation in which the second frequency conversion signal is restored to the third signal in the master unit 120-*n*** will be described in detail.

The master signal transmitting/receiving unit 230 may output the received receive signal to the master signal separating unit 240. In this case, when the master signal transmitting/receiving unit 230 and the remote signal transmitting/receiving unit 250 are connected to each other through the optical transmission line, the receive signal will be received as the optical signal. Accordingly, the master signal transmitting/receiving unit 230 may include the wavelength division multiplexer (WDM) for receiving the transmit signal as the optical signal. Further, the master signal transmitting/receiving unit 230 may include the photo diode for converting the optical signal into the electrical signal. Therefore, the master signal transmitting/receiving unit 230 may restore the receive signal received as the optical signal to the electrical signal and output the electrical signal to the master signal separating unit 240.

The master signal separating unit 240 may separate the input receive signal into the second frequency conversion signal and/or the fourth signal. Further, the master signal separating unit 240 may output the second frequency conversion signal to the master signal transmitting/receiving unit 210. Since the operation in which the master signal separating unit 240 separates the receive signal into the second frequency conversion signal and/or the fourth signal is apparent to those skilled in the art, detailed description of the operation will be omitted.

The master frequency converting unit 210 may convert the second frequency conversion signal into the third signal by using the oscillation frequency signal. Hereinafter, the operation in which the master frequency converting unit 210 converts the second frequency conversion signal into the first signal will be described in more detail with reference to FIG. 3.

Referring to FIG. 3, the master local oscillating unit 320 may continuously generate and output the same oscillation frequency signal as described above. When the second master frequency converting unit 330 receives the second frequency conversion signal, the second master frequency converting unit 330 may convert the frequency of the second frequency conversion signal into the predetermined frequency by using the oscillation frequency signal input in the master local oscillating unit 320 and convert the predetermined frequency into the third signal. Herein, the second master frequency converting unit 430 may include the mixer. Therefore, the mixer may convert the second frequency conversion signal into the third signal by mixing the second frequency conversion signal and the oscillation frequency signal.

For example, assumed that the transmit frequency is set to 4 GHz and the receive frequency is set to 6 GHz, the frequency of the second frequency conversion signal will be 4 GHz. The reason is that when the third signal having the frequency of 6 GHz and the oscillation frequency signal are mixed with each other, the second frequency conversion signal having the frequency of 4 GHz is preconfigured to be generated. Therefore, the second master frequency converting unit 430 may restore the third signal having the frequency of 6 GHz by mixing the second frequency conversion signal and the oscillation frequency signal.

Referring back to FIG. 2, the master unit 120 may transmit the third signal and/or the fourth signal to the base station 110.

As described above, the n-th remote unit 130-$n$ may convert the frequency of the third signal into the oscillation frequency in order to transmit the third and fourth signals to the master unit 120 connected through the single transmission line without overlapping of the third and fourth signals. Accordingly, the n-th remote unit 130-$n$ needs to search the unused band in order to transmit the MIMO signal. The reason is that the transmit frequency and the receive frequency are distinguished in the FDD scheme and it is apparent that when the third signal occupies the receive frequency in reverse transmission, the transmit frequency is the unused frequency.

Further, there is no possibility that when the master unit 120 and the n-th remote unit 130-$n$ are connected to each other through the single optical transmission line, the second frequency conversion signal will be interfered by a forward transmission signal. The reason is that when the master unit 120 and the n-th remote unit 130-$n$ are connected to each other through the optical transmission line, the forward signal and the reverse signal do not overlap with each other even though frequencies of both the forward signal and the reverse signal are the same as each other by the directionality of the optical signal. Therefore, since the n-th remote unit 130-$n$ need not include the plurality of local oscillators for variously converting the frequency, the price of the product may be lowered.

Hereinafter, the case in which the master unit 120 and the n-th remote unit 130-$n$ according to the embodiment of the inventive concept will be described with reference to FIG. 5.

Figure 5:
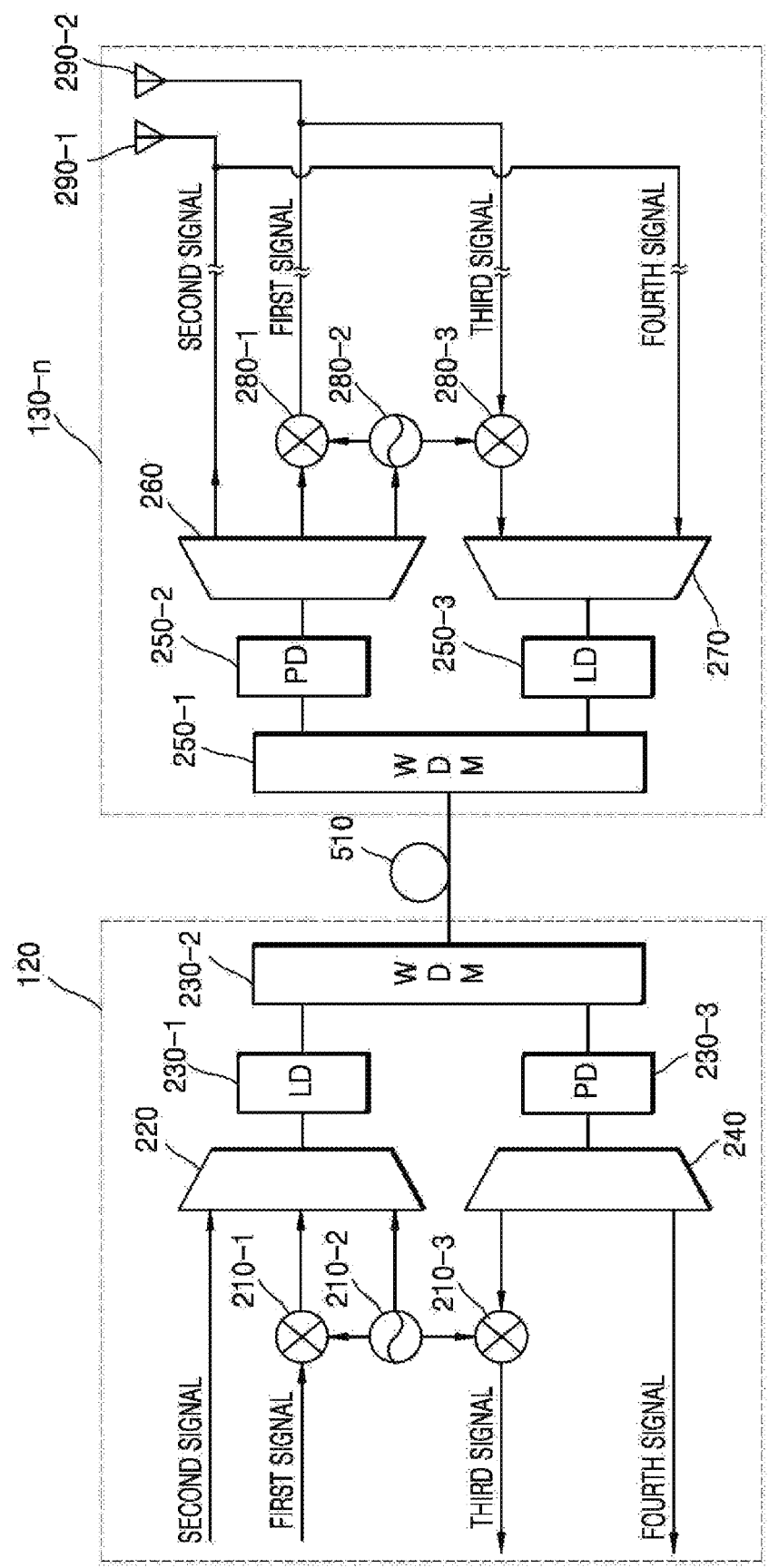
FIG. 5 is a circuit diagram of a master unit and a remote unit connected through an optical transmission line according to an embodiment of the inventive concept.

FIG. 5 is a circuit diagram of a master unit and a remote unit connected through an optical transmission line according to an embodiment of the inventive concept.

Referring to FIG. 5, the first signal received from the base station 110 may be input into a first master mixer 210-1 included in the first master frequency converting unit 310. In addition, a master local oscillating unit 210-2 included in the master local oscillating unit 320 may output the oscillation frequency signal to the first master mixer 210-1 and the master frequency combining unit 220. The first master mixer 210-1 may generate the first frequency conversion signal by using the first signal and the oscillation frequency signal and output the generated first frequency conversion signal to the master frequency combining unit 220. In this case, the frequency of the first frequency conversion signal may correspond to the receive frequency.

The master frequency combining unit 220 combines the first frequency conversion signal, the second signal, and the oscillation frequency signal to generate the transmit signal. Further, the master frequency combining unit 220 may output the generated transmit signal to a master laser diode 230-1 included in the master signal transmitting/receiving unit 230 and convert the transmit signal into the optical signal. In addition, the transmit signal converted into the optical signal is output to a master wavelength division multiplexer 230-2 included in the master signal transmitting/receiving unit 230 to be transmitted to a remote wavelength division multiplexer 250-1 included in the remote signal transmitting/receiving unit 250. In this case, the master wavelength division multiplexer 230-2 and the remote wavelength division multiplexer 250-1 may be connected to each other through a single optical transmission line 510.

Further, the remote wavelength division multiplexer 250-1 may output the transmit signal received as the optical signal to a remote photo diode 250-2 included in the remote signal transmitting/receiving unit 250. Therefore, the remote photo diode 250-2 may convert the transmit signal received as the optical signal to the electrical signal and output the electrical signal to the remote signal separating unit 260. The remote signal separating unit 260 may separate the input transmit signal into the first frequency conversion signal, the second signal, and/or the oscillation frequency signal. Further, the remote signal separating unit 260 may output the first frequency conversion signal to a first remote mixer 280-1 included in the first remote frequency converting unit

410. In addition, the remote signal separating unit 260 may output the oscillation frequency signal to a remote local oscillator 280-2 included in the first remote frequency converting unit 410.

The remote local oscillator 280-2 may output the oscillation frequency signal received from the master unit 120 to the first remote mixer 280-1. The first remote mixer 280-1 may restore the first signal by using the first frequency conversion signal and the oscillation frequency signal. Therefore, the n-th remote unit 130-*n* may allow the first signal to be transmitted to the outside through a first antenna 290-1 and the second signal to be transmitted to the outside through a second antenna 290-2.

Meanwhile, the third signal received from the first antenna 290-1 may be input into the first remote mixer 280-1 included in the first remote frequency converting unit 410. Further, the remote local oscillator 280-2 may output the oscillation frequency signal received from the master unit 120 to a second remote mixer 280-3. The second remote mixer 280-3 may generate the second frequency conversion signal by using the third signal and the oscillation frequency signal and output the generated second frequency conversion signal to the master frequency combining unit 270. In this case, the frequency of the second frequency conversion signal may correspond to the transmit frequency.

The remote frequency combining unit 270 combines the second frequency conversion signal and the fourth signal to generate the receive signal. Further, the remote frequency combining unit 270 may output the generated receive signal to a remote laser diode 250-3 included in the remote signal transmitting/receiving unit 250 and convert the receive signal into the optical signal. In addition, the receive signal converted into the optical signal is output to the remote wavelength division multiplexer 250-1 to be transmitted to the master wavelength division multiplexer 230-2.

Further, the master wavelength division multiplexer 230-2 may output the receive signal received as the optical signal to a master photo diode 230-3 included in the master signal transmitting/receiving unit 230. The master photo diode 230-3 may convert the receive signal received as the optical signal into the electrical signal and output the electrical signal to the master signal separating unit 240. The master signal separating unit 240 may separate the input receive signal into the second frequency conversion signal and the fourth signal. Further, the master signal separating unit 240 may output the second frequency conversion signal to a second master mixer 210-3 included in the second master frequency converting unit 330.

The master local oscillator 210-2 may output the oscillation frequency signal to the second master mixer 210-3. The second master mixer 210-3 may restore the third signal by using the second frequency conversion signal and the oscillation frequency signal. Therefore, the master unit 120 may transmit the third signal and the fourth signal to the base station 110.

The inventive concept has been described with reference to the preferred embodiments. However, it will be appreciated by those skilled in the art that various modifications and changes of the inventive concept can be made without departing from the spirit and the scope of the inventive concept which are defined in the appended claims and their equivalents.

What is claimed is:

1. A master unit included in a distributed antenna system of a frequency division duplex scheme, comprising:
    a frequency converter configured to generate a first frequency-converted forward signal by converting a frequency of a first forward signal received from a base station into a reverse frequency reserved for a reverse communication;
    a signal combiner configured to generate a combined forward signal including the first frequency-converted forward signal and a second forward signal received from the base station; and
    a signal transceiver configured to transmit the combined forward signal to a remote unit connected through a single transmission line,
    wherein the first frequency-converted forward signal is transmitted to the remote unit through the reverse frequency, and the second forward signal is transmitted to the remote unit through a transmit frequency reserved for a forward communication.

2. The master unit of claim 1, wherein the frequency converter includes:
    a local oscillator configured to output a predetermined oscillation frequency signal; and
    a first frequency converter configured to generate the first frequency-converted forward signal by using the first forward signal and the oscillation frequency signal.

3. The master unit of claim 2, wherein the signal combiner is configured to generate the combined forward signal by combining the first frequency-converted forward signal, the second forward signal, and the oscillation frequency signal.

4. The master unit of claim 2, further comprising:
    a signal separator configured to separate a combined reverse signal into a first frequency-converted reverse signal and a second reverse signal, and output the first frequency-converted reverse signal and the second revere signal to the frequency converter,
    wherein the signal transceiver receives the combined reverse signal from the remote unit and outputs the received combined reverse signal to the signal separator, and
    wherein the frequency converter converts the first frequency-converted reverse signal into a first reverse signal by using the oscillation frequency signal.

5. The master unit of claim 4, wherein the frequency converter further includes a second frequency converter configured to convert the first frequency-converted reverse signal into the first reverse signal by using the oscillation frequency signal, and
    wherein the local oscillator outputs the oscillation frequency signal to the second frequency converter.

6. A remote unit included in a distributed antenna system of a frequency division duplex scheme, comprising:
    an antenna configured to receive a first reverse signal and a second reverse signal by a reverse communication;
    a frequency converter configured to generate a first frequency-converted reverse signal by converting a frequency of the first reverse signal into a forward frequency reserved for a forward communication;
    a signal combiner configured to generate combined reverse signal including the second reverse signal and the first frequency-converted reverse signal; and
    a signal transceiver configured to transmit the combined reverse signal to a master unit by the reverse communication,
    wherein the first frequency-converted reverse signal is transmitted through the forward frequency, and the second reverse signal is transmitted through a reverse frequency reserved for the reverse communication.

7. A distributed antenna system of a frequency division duplex scheme, comprising:

a master unit configured to convert a first forward signal received from a base station into a first frequency-converted forward signal by using a predetermined oscillation frequency signal, generate a combined forward signal by combining the first frequency-converted forward signal, a second forward signal received from the base station, and the oscillation frequency signal, and transmit the combined forward signal by a forward communication; and a remote unit configured to separate the combined forward signal into the first frequency-converted forward signal, the second forward signal, and the oscillation frequency signal, and convert the first frequency-converted forward signal into the first forward signal by using the oscillation frequency signal, wherein the master unit generates the first frequency-converted forward signal by converting a frequency of the first forward signal into a reverse frequency reserved for a reverse communication, wherein the first frequency-converted forward signal is transmitted to the remote unit through the reverse frequency, and the second forward signal is transmitted to the remote unit a forward frequency reserved for the forward communication.

8. The distributed antenna system of claim 7, wherein the remote unit converts a first reverse signal received by the reverse communication into a first frequency-converted reverse signal by using the oscillation frequency signal, generates a combined reverse signal including a second reverse signal received by the reverse communication and the first frequency-converted reverse signal, and transmits the combined reverse signal to the master unit.

9. The distributed antenna system of claim 8, wherein the master unit separates the combined reverse signal into the first frequency-converted reverse signal and the second reverse signal, converts the first frequency-converted reverse signal into the first reverse signal by using the oscillation frequency signal, and transmits the first reverse signal and the second reverse signal to the base station.

* * * * *